(12) United States Patent
Sibbach et al.

(10) Patent No.: US 12,467,385 B1
(45) Date of Patent: Nov. 11, 2025

(54) OUTLET GUIDE VANE MOUNT

(71) Applicant: General Electric Company, Evendale, OH (US)

(72) Inventors: Arthur W. Sibbach, Boxford, MA (US); Nicholas Joseph Kray, Evendale, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/015,244

(22) Filed: Jan. 9, 2025

(51) Int. Cl.
*F01D 5/30* (2006.01)
*F01D 9/04* (2006.01)
*F01D 25/00* (2006.01)

(52) U.S. Cl.
CPC ............ *F01D 25/005* (2013.01); *F01D 9/04* (2013.01); *F05D 2220/32* (2013.01); *F05D 2240/12* (2013.01); *F05D 2300/6033* (2013.01)

(58) Field of Classification Search
CPC . F01D 9/04; F01D 9/041; F01D 9/042; F01D 9/00; F01D 7/00; F01D 5/30; F01D 5/3007; F05D 2240/12
See application file for complete search history.

(56) References Cited

U.S. PATENT DOCUMENTS

| | | |
|---|---|---|
| 4,113,910 A | 9/1978 | Loyd |
| 4,992,317 A | 2/1991 | Chess et al. |
| 8,715,809 B2 | 5/2014 | Ravey |
| 10,132,170 B2 | 11/2018 | Garcia-Crespo et al. |
| 10,196,937 B2 | 2/2019 | Wunsch et al. |
| 10,408,227 B2 | 9/2019 | Bailey et al. |
| 10,557,361 B1* | 2/2020 | Karkos ................ B32B 5/024 |
| 10,724,390 B2 | 7/2020 | King et al. |
| 10,800,128 B2 | 10/2020 | Feie et al. |
| 2009/0060745 A1* | 3/2009 | Douguet ............. F01D 5/3007 |
| | | 416/244 R |
| 2014/0004293 A1* | 1/2014 | Grooms, II ............ F01D 5/284 |
| | | 428/99 |
| 2019/0390555 A1 | 12/2019 | Kline et al. |

FOREIGN PATENT DOCUMENTS

| | | |
|---|---|---|
| EP | 2562360 A2 | 2/2013 |
| JP | H0988506 A * | 3/1997 |
| WO | WO-2025027257 A1 * | 2/2025 |

* cited by examiner

*Primary Examiner* — Nathaniel E Wiehe
*Assistant Examiner* — Maxime M Adjagbe
(74) *Attorney, Agent, or Firm* — Hanley, Flight & Zimmerman, LLC

(57) ABSTRACT

Outlet guide vane mounts with an airfoil structure are disclosed herein. The airfoil structure includes an airfoil platform, a composite material, a load spreader block, and a shim material, the composite material and a load spreader block positioned on the airfoil platform, the composite material having a first stiffness and the load spreader block having a second stiffness, and a shim material positioned between the composite material and the load spreader block, the shim material having a third stiffness different from at least one of the first stiffness or the second stiffness.

18 Claims, 6 Drawing Sheets

OUTLET GUIDE VANE MOUNT

FIELD OF THE DISCLOSURE

This disclosure relates generally to gas turbine engines and, more particularly, to outlet guide vane mounts for gas turbine engines.

BACKGROUND

A gas turbine engine is a widely-used power generating technology. Gas turbines engines are an example of an internal combustion engine that uses a burning air-fuel mixture to produce hot gases that spin a turbine to generate power. Applications of gas turbine engines can be found in aircraft, trains, ships, electrical generators, gas compressors, and pumps. For example, modern aircraft rely on a variety of gas turbine engines as part of a propulsion system to generate thrust, including a turbojet, a turbofan, a turboprop, and an afterburning turbojet.

A fan frame of the gas turbine engine can include a central hub connected to an annular fan casing by an annular array of radially extending fan outlet guide vanes ("OGVs"). OGVs can include an aero-turning element and a structural support for the fan casing. In some examples, separate members are provided for the aerodynamic and structural functions. The use of OGVs optimizes engine performance and efficiency by minimizing swirl and contributing to proper airflow direction before the airflow reaches an exhaust nozzle.

BRIEF DESCRIPTION OF THE DRAWINGS

The figures are not to scale. Instead, the thickness of regions may be enlarged in the drawings. In general, the same reference numbers will be used throughout the drawing(s) and accompanying written description to refer to the same or like parts.

DETAILED DESCRIPTION

Figure 1:
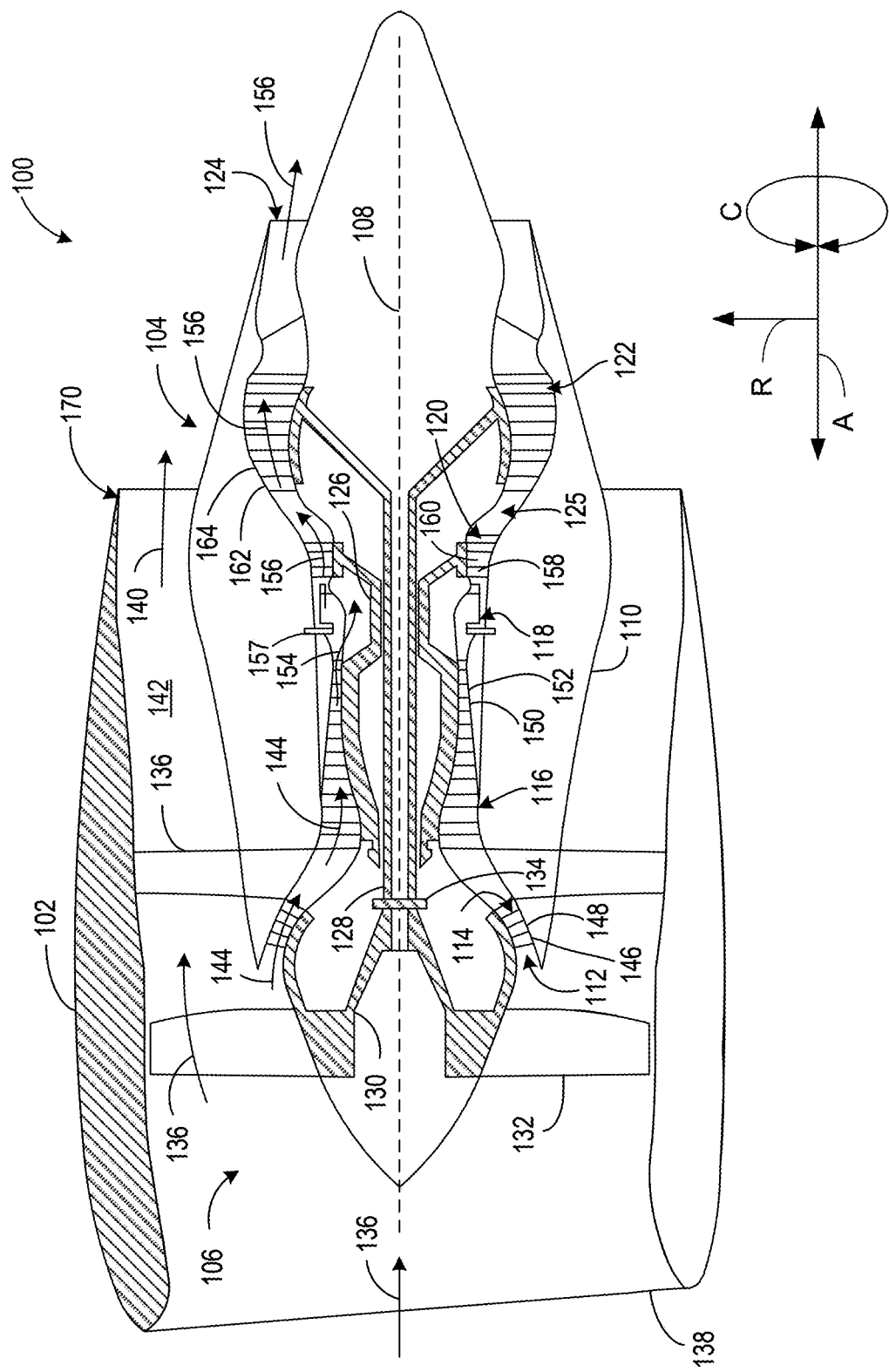
FIG. 1 is a schematic cross-sectional view of an example turbo engine including an outlet guide vane in which examples disclosed herein can be implemented.

Reference now will be made in detail to examples or embodiments of the presently described technology, one or more examples of which are illustrated in the drawings. Each example or embodiment is provided by way of explanation of the presently described technology, not limitation of the presently described technology. In fact, it will be apparent to those skilled in the art that various modifications and variations can be made in the presently described technology without departing from the scope or spirit of the presently described technology. For instance, features illustrated or described as part of one example or embodiment can be used with another example or embodiment to yield a still further example or embodiment. Thus, it is intended that the presently described technology covers such modifications and variations as come within the scope of the appended claims and their equivalents.

Turbo engines (e.g., turbofan engines, turboprop engines, etc.), such as those used on aircraft, include a gas turbine engine having a compressor section, a combustion section, and a turbine section in a serial flow arrangement. The combustion section includes a combustor that defines a combustion chamber where air and fuel are mixed and ignited to produce hot combustion gases. The outlet of the combustor is aligned axially and radially with an inlet of the turbine section to create a continuous hot gas flow path that directs the hot combustion gases from the combustor into a nozzle of the turbine section. In some engines, a sealing mechanism is disposed at the interface between the combustion liners and the inner and outer bands of the nozzle to prevent excess purge and leakage airflow from entering the hot gas flow path.

Some combustion sections include an inner structure assembly, which includes a diffuser and outlet guide vanes (OGVs) that direct air from the compressor section toward the combustor. OGVs (e.g., open rotor OGVs) include airfoil structure(s) to direct the flow of air (e.g., cantilevered-supported airfoil). In some examples, the airfoil structure includes composite materials which can be subject to a range of loading conditions. While composite materials of the airfoil provide certain advantages (e.g., reduced weight, increased strength, etc.), dynamic pressures, elevated temperatures, and/or vibrations can reduce the lifetime of composite material-based components. Such composite materials include bends and/or curves that define fillets (e.g., rounded transitions at points where a flat composite surface curves or bends). Fillets reduce stress concentrations and/or potential failure points at sharp corners, contributing to the structural integrity of the composite material. For example, sharp corners create high stress concentrations, while fillets allow for the stress to be distributed more evenly. In some examples, a radius of the fillet and/or fiber orientation in a ply of the fillet (e.g., layer(s) of the fillet) can be selected based on desired material properties, applied loads, and/or the geometry of a given bend to improve strength and/or stiffness of the bend region.

However, composite materials can be prone to delamination failure (e.g., failure of adhesion between layers that causes the layers to separate) despite the use of toughened materials or reductions in geometric stress concentrations that cause delamination damage (e.g., reducing load-carrying capacity and/or stiffness). For example, extreme conditions associated with gas turbine engines (e.g., frequent surge loadings, etc.) introduce peak tensile stresses and/or interlaminar stresses that can lead to composite material service failure and/or significantly reduce composite material durability.

Disclosed herein is an example method for mounting a composite material-based guide vane in a turbine engine. In examples disclosed herein, a shim material (e.g., highly polished metal) is positioned between the composite material of an airfoil structure and an attachment block designed to act as a load spreader. In examples disclosed herein, positioning of the shim material between the composite material of the airfoil structure and the load spreader block improves stress distribution and reduces interface friction. In some examples, the shim material is selected to provide a higher modulus of elasticity as compared to the composite material and/or the load spreader block. In some examples, the shim material covers at least 10 percent of the interface surface between the load spreader block and the composite material of the airfoil structure. As such, the shim material provides additional support for the composite material by increasing load-carrying capacity and/or stiffness. In examples described herein, the shim material can also be electrically isolated from the load spreader block and/or the rest of the airfoil structure (e.g., to protect from galvanic corrosion) by using fiberglass plies integrated into the shim material surface.

The terms "upstream" and "downstream" refer to a relative location or direction with respect to fluid flow between an upstream location or source of fluid and a downstream location or end location of the fluid. For example, "upstream" refers to a location that is relatively closer to or in a direction that is toward the upstream location or source of fluid, whereas "downstream" refers to a location that is relatively closer to or in a direction toward the downstream location or end location of the fluid.

As used herein, the terms "axial" and "longitudinal" both refer to a direction parallel to the centerline axis of a gas turbine engine (e.g., a turboprop, a core gas turbine engine, etc.), while "radial" refers to a direction perpendicular to the axial direction, and "tangential" or "circumferential" refers to a direction mutually perpendicular to the axial and radial directions. Accordingly, as used herein, "radially inward" refers to a relative location or direction along a radial line from the outer circumference of the gas turbine engine towards the centerline axis of the gas turbine engine, and "radially outward" refers to a relative location or direction along a radial line from the centerline axis of the gas turbine engine towards the outer circumference of the gas turbine engine.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation.

As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for case of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Referring now to the drawings, FIG. 1 is a schematic cross-sectional view of an example turbo engine 100 that can incorporate various examples disclosed herein. The example turbo engine 100 can be implemented on an aircraft and therefore referred to as an aircraft engine. In this example, the turbo engine 100 is a turbofan-type of engine. However, the principles of the present disclosure are also applicable to other types of engines, such as turboprop engines and engines without a nacelle, such as unducted fan (UDF) engines (sometimes referred to as propfans). Further, the example principles disclosed herein can be implemented on other types of engines, such as power-generation engines.

As shown in FIG. 1, the turbo engine 100 includes an outer bypass duct 102 (which may also be referred to as a nacelle, fan duct, or outer casing), a gas turbine engine 104, and a fan section 106. The gas turbine engine 104 and the fan section 106 are disposed at least partially in the outer bypass duct 102. The gas turbine engine 104 is disposed downstream from the fan section 106 and drives the fan section 106 to produce forward thrust.

As shown in FIG. 1, the turbo engine 100 and/or the gas turbine engine 104 define a longitudinal or axial centerline axis 108 extending therethrough for reference. FIG. 1 also includes an annotated directional diagram with reference to an axial direction A, a radial direction R, and a circumferential direction C. In general, as used herein, the axial direction A is a direction that extends generally parallel to the centerline axis 108, the radial direction R is a direction that extends orthogonally outward from or inward toward the centerline axis 108, and the circumferential direction C is a direction that extends concentrically around the centerline axis 108. Further, as used herein, the term "forward" refers to a direction along the centerline axis 108 in the direction of movement of the turbo engine 100, such as to the left in FIG. 1, while the terms "rearward" or "aft" refer to a direction along the centerline axis 108 in the opposite direction, such as to the right in FIG. 1.

The gas turbine engine 104 includes a substantially tubular outer casing 110 (which may also be referred to as a mid-casing) that defines an annular inlet 112. The outer casing 110 of the gas turbine engine 104 can be formed from a single casing or multiple casings. The outer casing 110 encloses, in serial flow relationship, a compressor section having a booster or low pressure compressor 114 ("LP compressor 114") and a high pressure compressor 116 ("HP compressor 116"), a combustion section 118, a turbine section having a high pressure turbine 120 ("HP turbine 120") and a low pressure turbine 122 ("LP turbine 122"), and an exhaust section 124. An air flow path 125 extends from the annular inlet 112 to exhaust section 124 such that compressors 114, 116, combustion section 118, the turbines 120, 122, and the exhaust section 124 are in fluid communication.

The gas turbine engine 104 includes a high pressure shaft 126 ("HP shaft 126") that drivingly couples the HP turbine 120 and the HP compressor 116. The gas turbine engine 104 also includes a low pressure shaft 128 ("LP shaft 128") that drivingly couples the LP turbine 122 and the LP compressor 114. The LP shaft 128 also couples to a fan shaft 130. The fan section 106 includes a plurality of fan blades 132 that are coupled to and extend radially outward from the fan shaft 130. In some examples, the LP shaft 128 may couple directly to the fan shaft 130 (i.e., a direct-drive configuration). In alternative configurations, the LP shaft 128 may couple to the fan shaft 130 via a reduction gear 134 (e.g., an indirect-drive or geared-drive configuration). While in this example the gas turbine engine 104 includes two compressors and two turbines, in other examples, the gas turbine engine 104 may include one compressor and one turbine. Further, in other examples, the gas turbine engine 104 can include more than two compressors and turbines. In such examples, the gas turbine engine 104 may include more than two drive shafts or spools.

As illustrated in FIG. 1, during operation of the turbo engine 100, air 136 enters an inlet 138 of the outer bypass duct 102. The air 136 is accelerated by the fan blades 132 (sometimes considered a low-pressure compressor). A first portion 140 of the air 136 flows into a bypass airflow passage 142 (defined between the outer bypass duct 102 and the gas turbine engine 104), while a second portion 144 of the air 136 flows into the inlet 112 of the gas turbine engine 104 and to the LP compressor 114. One or more sequential stages of LP compressor stator vanes 146 and LP compressor rotor blades 148 coupled to the LP shaft 128 progressively compress the second portion 144 of the air 136 flowing through the LP compressor 114 en route to the HP compressor 116. Next, one or more sequential stages of HP compressor stator vanes 150 and HP compressor rotor blades 152 coupled to the HP shaft 126 further compress the second portion 144 of the air 136 flowing through the HP compressor 116. This provides compressed air 154 to the combustion section 118 where the compressed air 154 mixes with fuel and burns to produce combustion gases 156. Fuel is injected into the combustion section 118 by one or more fuel nozzles 157.

The combustion gases 156 flow through the HP turbine 120 where one or more sequential stages of HP turbine stator vanes 158 and HP turbine rotor blades 160 coupled to the HP shaft 126 extract a first portion of kinetic and/or thermal energy. The HP turbine rotor blades 160 rotates the HP shaft 126, which rotates the HP compressor rotor blades 152 and therefore supports operation of the HP compressor 116. The combustion gases 156 then flow through the LP turbine 122 where one or more sequential stages of LP turbine stator vanes 162 and LP turbine rotor blades 164 coupled to the LP shaft 128 extract a second portion of thermal and/or kinetic energy therefrom. This energy extraction causes the LP shaft 128 to rotate, which supports operation of the LP compressor 114 and/or rotation of the fan shaft 130. The combustion gases 156 then exit the gas turbine engine 104 through the exhaust section 124 thereof. The combustion gases 156 mix with the first portion 140 of the air 136 exiting an exhaust nozzle 170 (e.g., a converging/diverging nozzle) of the bypass airflow passage 142 to produce propulsive thrust.

In the example of FIG. 1, the combustion section 118 includes an inner casing, a diffuser assembly, an outlet guide vane (OGV) assembly, or a diffuser/OGV assembly (not shown). In some examples, OGVs are coupled between an outer radial support arm and the inner radial support arm. In other examples, the OGVs can be a separate part or component from the diffuser. For example, the OGV assembly includes stationary vanes located at the turbine's exhaust section for directing and/or straightening the airflow leaving the turbine (e.g., reducing airflow swirl and ensuring a smooth transition of the airflow into the exhaust duct). As such, the OGVs are designed to promote airflow management (e.g., reducing turbulence, increasing overall engine efficiency and/or operational performance, etc.).

Figure 2:
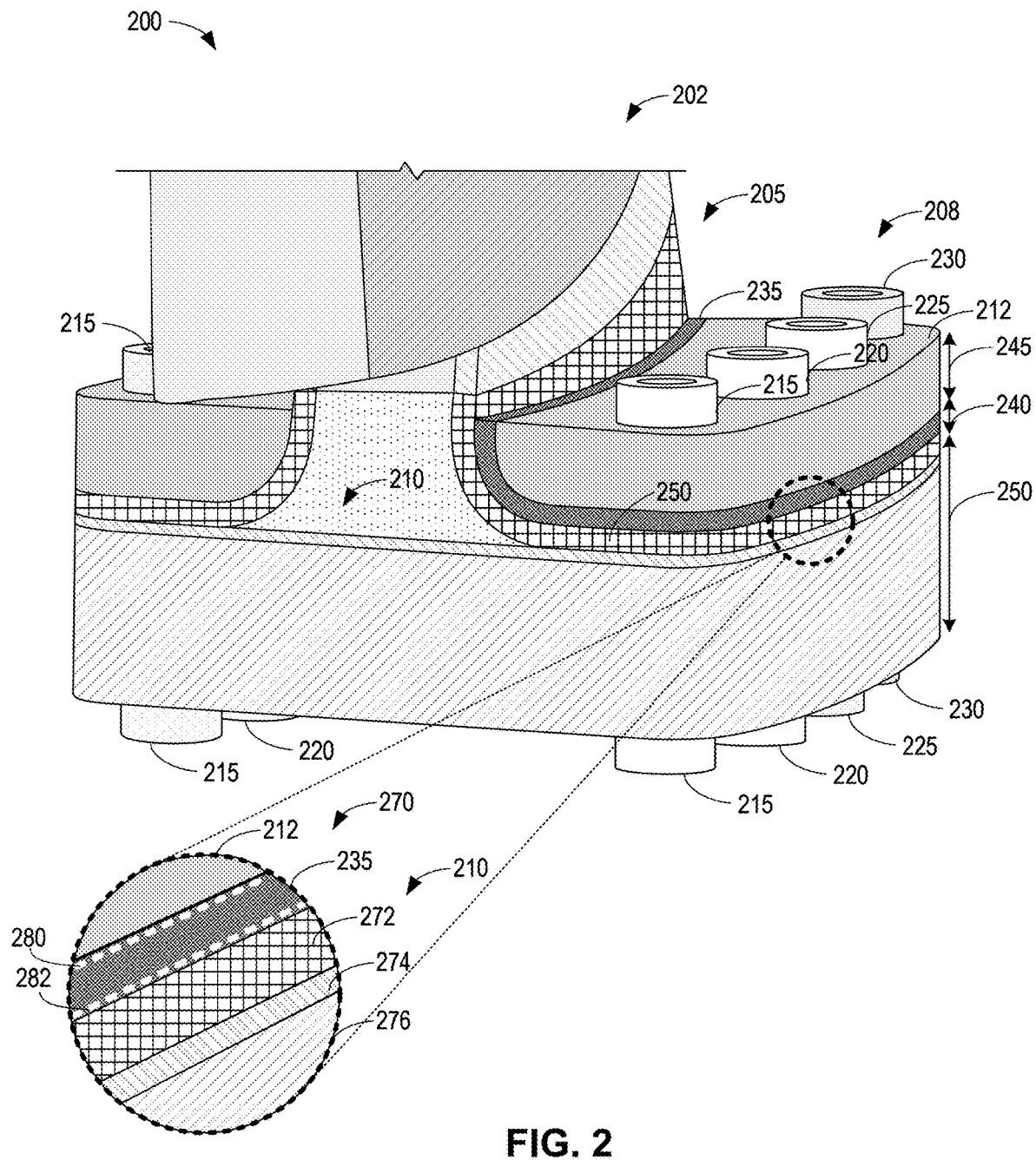
FIG. 2 is a perspective view of an example airfoil structure associated with the outlet guide vane of FIG. 1 showing an example positioning of a shim material with respect to a load spreader block and a composite material.

FIG. 2 is a perspective view 200 of an example airfoil structure associated with the outlet guide vane (OGV) assembly (e.g., located in the combustion section 118 of FIG. 1) showing an example positioning of a shim material with respect to a load spreader block and an airfoil. In the example of FIG. 2, the airfoil structure 202 includes an airfoil 205 and an airfoil platform 208. In examples disclosed herein, the airfoil 205 is a cantilevered-supported airfoil. The airfoil 205 includes a composite material 210 anchoring the airfoil 205 to the airfoil platform 208. A load spreader block 212 forms a portion of the airfoil platform 208, such that the load spreader block 212 is attached to the composite material 210 (e.g., using example bolted joints 215, 220, 225, 230 to form a bolted connection). In some examples, the load spreader block 212 provides an additional loading surface allowing for loads applied to the airfoil structure 202 to be distributed throughout the structure. The airfoil platform 208 provides additional stability for supporting the airfoil structure 202 by supporting loads applied to the airfoil 205. In examples disclosed herein, a shim material 235 is positioned between the load spreader block 212 and the composite material 210. For example, the shim material 235 promotes the spreading of loads around the bolted joints 215, 220, 225, 230 to prevent the composite material 210 from being crushed. For example, interface(s) between the bolted joint(s) and surrounding materials can experience increasing stress concentrations (e.g., from compression), as described in more detail in connection with FIGS. 3B and 3C.

In the example of FIG. 2, a single layer of the shim material 235 is positioned at an interface between the composite material 210 and the load spreader block 212. However, any number of layers of the shim material 235 and/or any number of shim material(s) 235 can be positioned between the composite material 210 and the load spreader block 212. In the example of FIG. 2, the shim material 235 has a first thickness 240, the load spreader block 212 has a second thickness 245, and the composite material 210 has a third thickness 250, where the first thickness 240 is different than the second thickness 245, and the second thickness 245 is different than the third thickness 250. In some examples, the thickness of the shim material 235 (e.g., first thickness 240) is adjusted to prevent and/or reduce contact between a radially inner surface of the composite material 210 and the load spreader block 212. While in the example of FIG. 2 the shim material 235 is shown positioned on one side of the airfoil structure 202, the shim material 235 can be positioned on both sides of the airfoil structure 202.

In some examples, the composite material 210 has a first stiffness (e.g., a first modulus of elasticity) and the load spreader block 212 has a second stiffness (e.g., a second modulus of elasticity), whereas the shim material 235 has a third stiffness (e.g., a third modulus of elasticity) different from at least one of the first stiffness or the second stiffness. For example, the shim material 235 can be selected to have a higher modulus of elasticity (e.g., Young's modulus of approximately 200 gigapascals (GPa)) as compared to the composite material 210 and/or the load spreader block 212. In some examples, the shim material 235 can include a nickel-chromium-based superalloy (e.g., an Inconel® alloy), titanium, and/or stainless steel. In some examples, the shim material 235 has a highly polished surface. However, any other type of material can be selected for the shim material 235 (e.g., materials withstanding high temperatures, pressures, and mechanical loads that are also resistant to oxidation and corrosion). In particular, the shim material 235 provides a hard surface transition between the composite material 210 and the load spreader block 212, assisting in the distribution of stress and the reduction of interface friction. In some examples, the shim material 235 covers at least 10% (e.g., 15-20%) of an interface surface between the load spreader block 212 and the composite material 210 (e.g., to allow the shim material to effectively distribute stress and/or reduce interface friction). For example, the shim material can cover a portion of the interface surface when the shim material has a perforated surface. In some examples, the shim material 235 includes an interrupted surface area and/or a perforated surface, as described in more detail in connection with FIGS. 5A and 5B.

In the example of FIG. 2, a magnified area 270 of the interface between the load spreader block 212, the shim material 235, and the composite material 210 is shown to highlight the arrangement of these layers in more detail. The magnified area 270 includes an arrangement of the composite material 210, including a first composite material layer 272, a second composite material layer 274, and a third composite material layer 276. For example, the composite material layer(s) 272, 274, 276 can include any type of material used to create a lightweight but durable structure for high performance-based applications where strength and weight represent factors (e.g., polymer composite, carbon fiber or glass fiber embedded in a resin matrix, ceramic matrix composite, titanium alloy, etc.). As previously described, composite materials can be at risk of delamination from high interlaminar stresses that impact structural integrity (e.g., separation or splitting of layers within the composite material, separation of layers at the interface between ceramic fibers and the ceramic matrix, etc.). The introduction of the shim material 235 at the interface between the load spreader block 212 and the composite material layer(s) 272, 274, 276 provides additional protection for the composite material from delamination-based damage caused by external loading (e.g., through a redistribution of stress concentrations).

In the example of FIG. 2, a layer of fiberglass plies (e.g., a first layer of fiberglass plies 280, a second layer of fiberglass plies 282) separates at least one of the load spreader block 212 or the composite material 210 (e.g., the first composite material layer 272) from the shim material 235. For example, the fiberglass plies 280, 282 can be used to electrically isolate the shim material 235 from the load spreader block 212 and the composite material 210. As such, the fiberglass plies 280, 282 act as an isolation material to eliminate galvanic corrosion. When multiple shim materials 235 are used between the composite material 210 and the load spreader block 212, a first layer of fiberglass plies 280 can be used to separate the first shim material from the load spreader block 212 and a second layer of fiberglass plies 282 can be used to separate the second shim material from the composite material 210 of the airfoil structure 202, as described in more detail in connection with FIGS. 3A and 4.

Figure 3A:
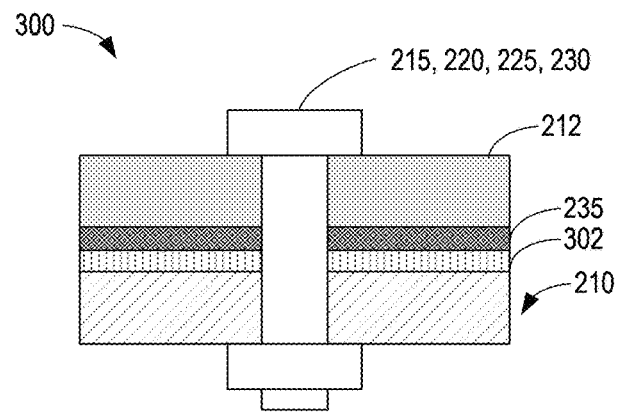
FIG. 3A is an example cross-sectional view of a bolted joint passing through a first shim material and a second shim material positioned with respect to the load spreader block and the composite material of FIG. 2.

FIG. 3A is an example cross-sectional view 300 of bolted joint(s) 215, 220, 225, 230 passing through a first shim material (e.g., shim material 235 of FIG. 2) and a second shim material (e.g., shim material 302) positioned with respect to the load spreader block 212 and the composite material 210 of FIG. 2. In the example of FIG. 3A, the shim material(s) 235, 302 are combined to provide additional structural support, including reduced interface friction and/or distribution of stress. In some examples, the first shim material 235 and the second shim material 302 are different types of materials (e.g., Inconel®, titanium, stainless steel, etc.). In some examples, the first shim material 235 and the second shim material 302 are the same type of material (e.g., Inconel®). In some examples, the first shim material 235 and the second shim material 302 have the same modulus of elasticity. In some examples, the first shim material 235 and the second shim material 302 have different moduli of elasticity. However, the moduli of elasticity of the first shim material 235 and the second shim material 302 can be selected to be higher than the moduli of elasticity associated with the load spreader block 212 and/or the composite material 210.

Figures 3B, 3C:
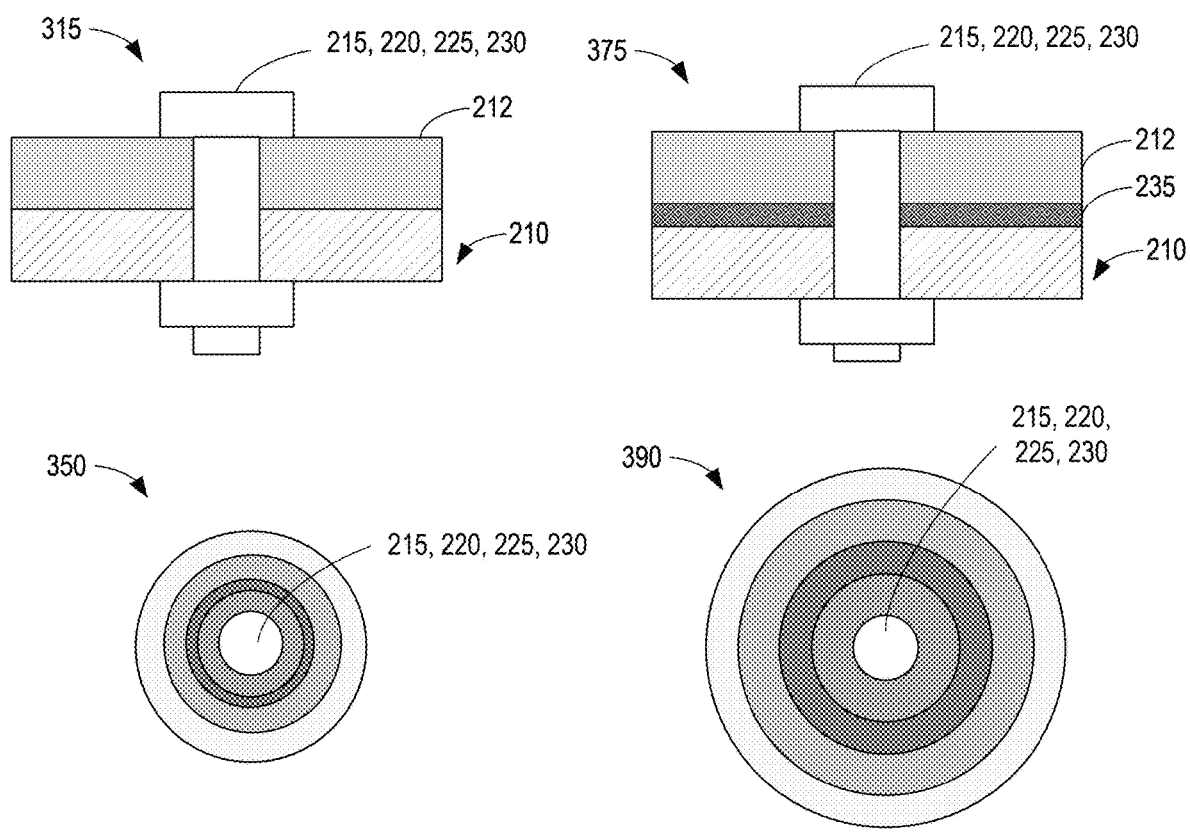
FIG. 3B is an example cross-sectional view of the load spreader block and the composite material of FIG. 2 without the use of a shim material positioned in-between, resulting in compression-based stress localization to area(s) surrounding the bolted joint.
FIG. 3C is an example cross-sectional view of the load spreader block and the composite material of FIG. 2 with the use of a shim material positioned in-between, resulting in an increased distribution of compression-based stress surrounding the bolted joint.

FIG. 3B is an example cross-sectional view 315 of the load spreader block 212 and the composite material 210 of FIG. 2 without a shim material positioned in between the load spreader block 212 and the composite material 210, resulting in compression-based stress localization to area(s) surrounding the bolted joint(s) 215, 220, 225, 230. For example, without the use of the shim material 235 as illustrated in connection with FIGS. 2 and 3A, the highest stress levels occur in the immediate vicinity of (e.g., regions surrounding) the bolted joint(s) 215, 220, 225, 230, as shown in connection with example stress distribution diagram 350.

FIG. 3C is an example cross-sectional view 375 of the load spreader block 212 and the composite material 210 of FIG. 2 with the use of the shim material 235 positioned in-between, resulting in an increased distribution of compression-based stress surrounding the bolted joint(s) 215, 220, 225, 230. In the example of FIG. 3C, adding the shim material 235 enables the stress due to compression from the bolted joint(s) 215, 220, 225, 230 to be spread over a much larger area, as shown in connection with example stress distribution diagram 390. In some examples, adding additional shim material 235 layers allows for stresses to dissipate more readily around the bolted joint(s) 215, 220, 225, 230.

Figure 4:
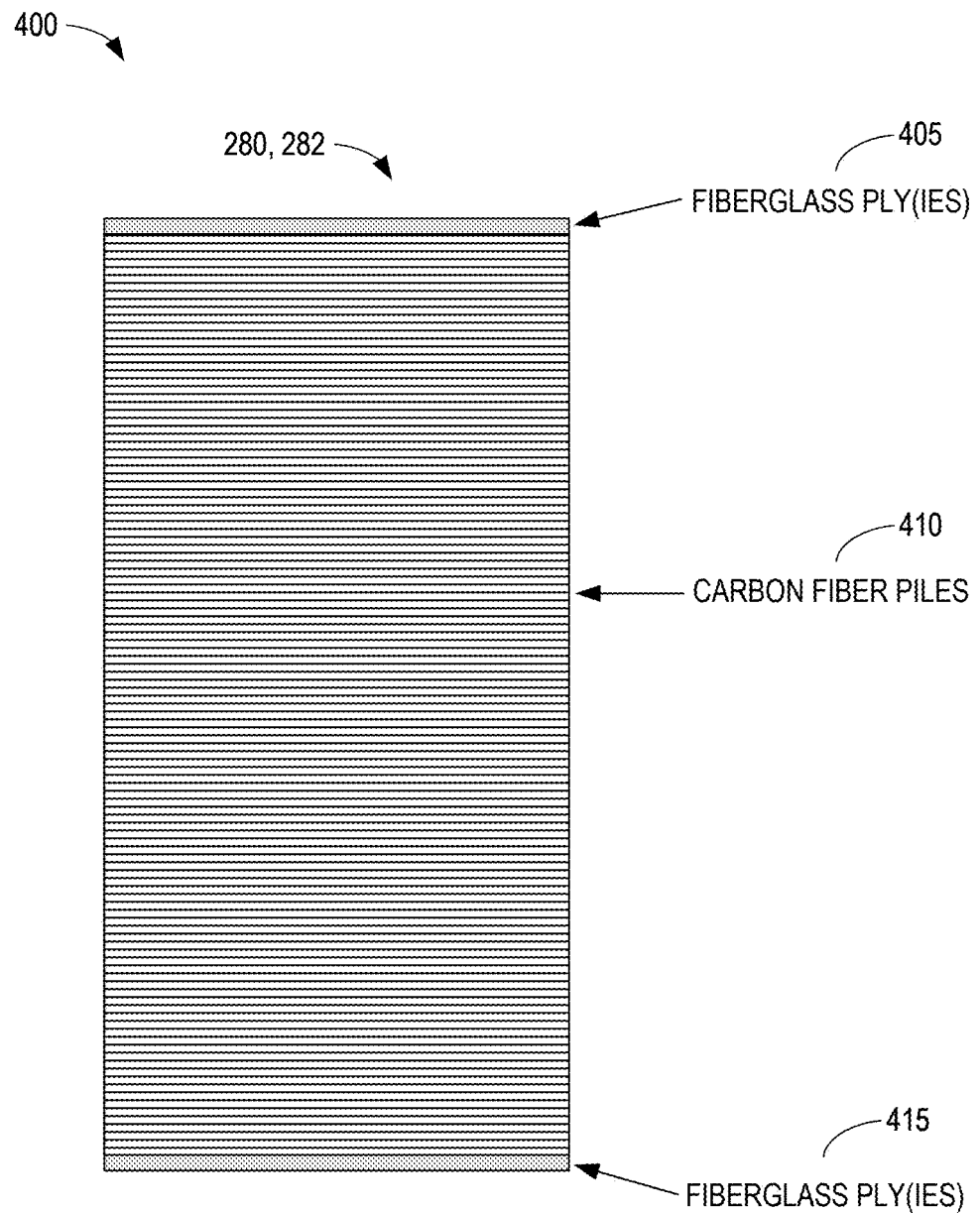
FIG. 4 is an example layout of a composite structure composition using carbon fiber plies with one or more fiberglass plies for electrical contact insulation separating the shim material from the load spreader block and/or the composite material of FIG. 2.

FIG. 4 is an example layout of a composite structure composition 400 using carbon fiber plies 410 with one or more fiberglass plies 405, 415 for electrical contact insulation separating the shim material 235 from the load spreader block 212 and/or the composite material 210 of FIG. 2. In some examples, the composite structure composition 400 can include a plurality of the carbon fiber plies 410 with one or more fiberglass plies (e.g., fiberglass plies 405, 415) incorporated into the exterior surfaces to insulate the carbon fiber against electrical contact with metallic materials (e.g., materials that abut the composite structure) to prevent galvanic corrosion of the carbon fiber. In the example of FIG. 4, the stack of carbon fiber plies 410 is impregnated with a matrix material cured to form a solid component. As such, the composite structure composition 400 can be used to isolate the shim material 235 from the load spreader block 212 and/or the composite material 210, as shown in connection with FIG. 2.

Figure 5A:
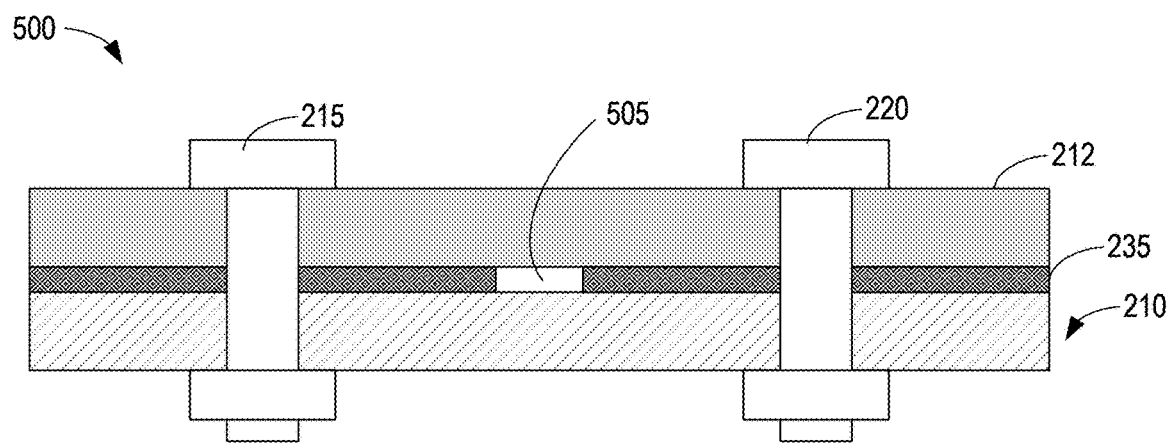
FIG. 5A is an example cross-sectional view of the load spreader block and composite material of FIG. 2, where the shim material is interrupted without allowing contact between the load spreader block and the composite material.
Figure 5B:
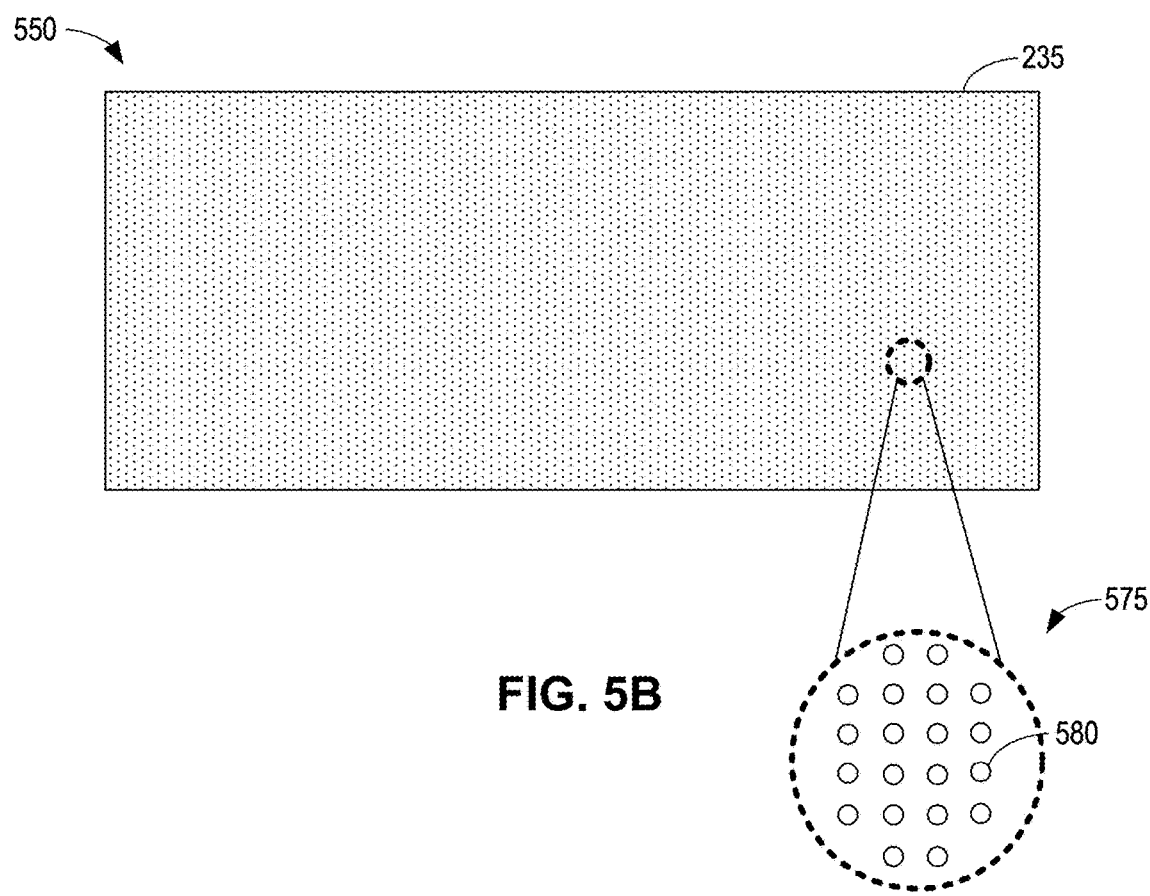
FIG. 5B is an example view of the shim material including perforations.

FIG. 5A is an example cross-sectional view 500 of the load spreader block 212 and the composite material 210 of FIG. 2, where the shim material 235 is interrupted (e.g., including discontinuities in the shim material) without allowing contact between the load spreader block 212 and the composite material 210. For example, the shim material 235 can be contiguous or interrupted, depending on the desired material property characteristics (e.g., stiffness, elasticity, thermal conductivity, electrical conductivity, etc.) of the final shim material layer separating the load spreader block 212 from the composite material 210 (e.g., thickness, permeability, density, stiffness, etc.). In the example of FIG. 5A, the shim material can include interruptions (e.g., interruption 505) occurring between the positioned bolted joint(s) 215, 220, 225, 230, ensuring that the interruptions are absent in regions near the bolted joint(s) 215, 220, 225, 230 to allow for coverage of the shim material 235 surrounding the bolted joint(s) 215, 220, 225, 230. In an alternate embodiment, the shim material 235 can be perforated (e.g., perforated shim material 550), with the perforations small enough to prevent contact between the load spreader block 212 and the composite material 210. As illustrated in the example of FIG. 5B, a magnified view 575 of perforations 580 indicates that the perforations are reduced to allow for the shim material 235 to maintain a distance between the load spreader block 212 and the composite material 210.

Figure 6:
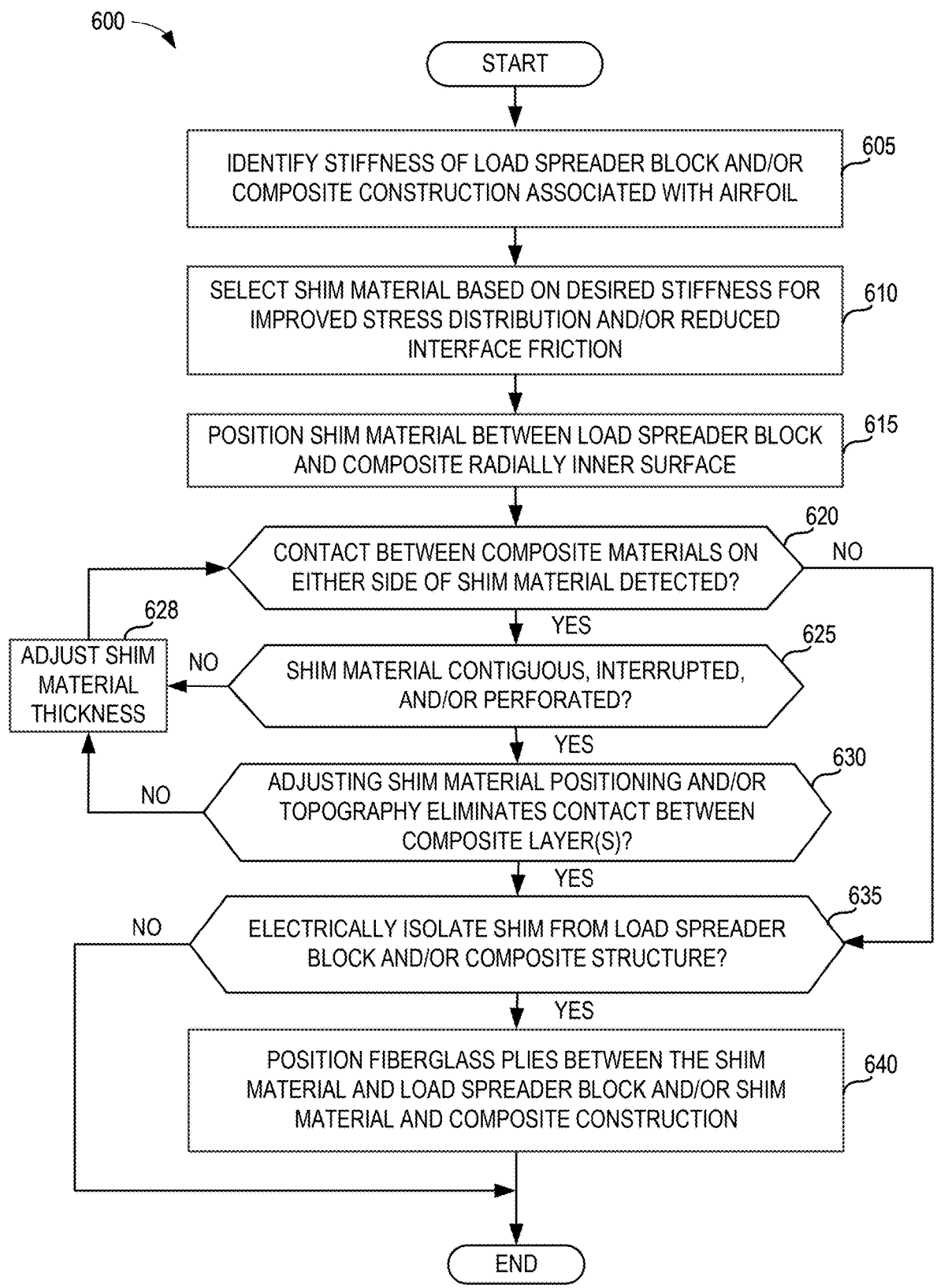
FIG. 6 is a flowchart representative of an example method of selecting and/or positioning the shim material relative to the load spreader block and/or the composite material of FIG. 2, including electrically insulating the shim material.

FIG. 6 is a flowchart representative of an example method 600 of selecting and/or positioning the shim material 235 relative to the load spreader block 212 and/or the composite material 210 of FIG. 2, including electrically insulating the shim material 235. The method begins at block 605, at which a stiffness (e.g., modulus of elasticity) of the load spreader block 212 and/or the composite material 210 associated with the airfoil structure is identified. In the example of FIG. 6, the shim material is selected based on a desired stiffness for improved stress distribution and/or reduced interface friction, at block 610. For example, the shim material can be selected to have a higher modulus of elasticity (Young's modulus) compared to the surrounding load spreader block 212 and/or the composite material 210. For example, the shim material can be an Inconel® alloy, titanium, or stainless steel. In some examples, more than one type of shim material can be positioned between the load spreader block 212 and/or the composite material 210. In some examples, multiple layers of the same shim material can be positioned between the load spreader block 212 and/or the composite material 210, as shown in connection with FIG. 3A. Once the shim material is positioned between the load spreader block 212 and/or the composite material 210 (e.g., composite radially inner surface), at block 615, contact between the composite material(s) (e.g., load spreader block 212 and/or the composite material 210) on either side of the positioned shim material is evaluated to determine whether to adjust shim material layer(s) at block 620.

If contact between the materials is identified despite the presence of the shim material, a further evaluation of the topography of the shim material can be performed to determine whether the material is contiguous, interrupted, and/or perforated, at block 625, as discussed in more detail in connection with FIGS. 5A and 5B. Determination of the shim material topography assists in identifying whether the shim material layer(s) is/are to be adjusted and/or whether a thickness of the shim material layer(s) is to be changed. For example, when the shim material is not interrupted and/or perforated, the shim material can be thinner as compared to when the shim material topography includes interruptions and/or perforations. In some examples, adjusting the shim material positioning and/or topography eliminates contact between composite layer(s), at block 630. In some examples, adjusting the thickness of the shim material layer(s) eliminates any remaining contact between the load spreader block 212 and/or the composite material 210, at block 628. If there is no initial contact identified between the load spreader block 212 and/or the composite material 210 after positioning of the shim material, a determination can be made whether to include electrical insulation of the shim material (e.g., to prevent galvanic corrosion), at block 635. If electrical insulation is desired (e.g., for enhanced durability, corrosion prevention, containment of an electrical current, etc.), fiberglass plies can be positioned between the shim material layer(s) and the load spreader block 212 and/or the shim material layer(s) and the composite material 210, at block 640, as discussed in more detail in connection with FIG. 4.

From the foregoing, it will be appreciated that the example airfoil structure provides increased load-carrying capacity and/or stiffness based on the use of a shim material positioned between a load spreader block and a composite material of the airfoil structure. For example, positioning of the shim material between the composite material of the airfoil structure and the load spreader block improves stress distribution and reduces interface friction. The shim material (e.g., Inconel® alloy, stainless steel, titanium, etc.) can be selected to provide a higher modulus of elasticity as compared to the composite material and/or the load spreader block. Additionally, the shim material can be positioned to cover at least 10 percent of the interface surface between the load spreader block and the composite material of the airfoil structure. In some examples, the shim material can also be electrically isolated from the load spreader block and/or the rest of the airfoil structure to protect from galvanic corrosion (e.g., using fiberglass plies integrated into the shim material surface).

Further examples and example combinations thereof are provided by the subject matter of the following clauses:

An airfoil structure, including an airfoil platform, a composite material, a load spreader block, and a shim material, the composite material and a load spreader block positioned on the airfoil platform, the composite material having a first stiffness and the load spreader block having a second stiffness, and a shim material positioned between the composite material and the load spreader block, the shim material having a third stiffness different from at least one of the first stiffness or the second stiffness.

The airfoil structure of any preceding clause, wherein the airfoil structure forms a part of a cantilevered-supported airfoil.

The airfoil structure of any preceding clause, wherein the shim material is a nickel-chromium-based superalloy.

The airfoil structure of any preceding clause, wherein the load spreader block includes at least one bolted connection.

The airfoil structure of any preceding clause, wherein a Young's modulus associated with the third stiffness is higher than the Young's modulus associated with at least one of the first stiffness or the second stiffness.

The airfoil structure of any preceding clause, wherein the shim material covers at least 10% of an interface surface between the load spreader block and the composite material.

The airfoil structure of any preceding clause, wherein the shim material includes an interrupted surface area.

The airfoil structure of any preceding clause, wherein the shim material includes a perforated surface.

The airfoil structure of any preceding clause, wherein a thickness of the shim material is increased to prevent contact between the composite material and the load spreader block.

The airfoil structure of any preceding clause, wherein a layer of fiberglass plies separates at least one of the load spreader block or the composite material from the shim material.

An airfoil structure, including a first shim material positioned adjacent to a load spreader block, a second shim material positioned adjacent to an airfoil, wherein the first shim material is in contact with the second shim material, a first stiffness of the first shim material and a second stiffness of the second shim material different from at least one of (1) a third stiffness of the load spreader block or (2) a fourth stiffness of the airfoil.

The airfoil structure of any preceding clause, wherein the airfoil structure forms a part of a cantilevered-supported airfoil.

The airfoil structure of any preceding clause, wherein the first shim material or the second shim material is an Inconel® alloy.

The airfoil structure of any preceding clause, wherein the load spreader block includes at least one bolted connection.

The airfoil structure of any preceding clause, wherein a Young's modulus associated with the first stiffness or the second stiffness is higher than the Young's modulus associated with at least one of the third stiffness or the fourth stiffness.

The airfoil structure of any preceding clause, wherein at least one of the first shim material or the second shim material covers at least 10% of an interface surface between the load spreader block and a composite material of the airfoil structure.

The airfoil structure of any preceding clause, wherein at least one of the first shim material or the second shim material includes an interrupted surface area.

The airfoil structure of any preceding clause, wherein at least one of the first shim material or the second shim material includes a perforated surface.

The airfoil structure of any preceding clause, wherein a first layer of fiberglass plies separates the first shim material from the load spreader block.

The airfoil structure of any preceding clause, wherein a second layer of fiberglass plies separates the second shim material from the airfoil structure.

A method, including identifying a stiffness of at least one of a load spreader block or a composite material of an airfoil, selecting a shim material based on the stiffness, and positioning the shim material between the load spreader block and the composite material.

The method of any preceding clause, further including adjusting a thickness of the shim material.

The method of any preceding clause, wherein the shim material is at least one of a contiguous material, a perforated material, or an interrupted material.

The method of any preceding clause, further including selecting an electrically isolating material to electrically isolate the shim material from the load spreader and the composite material.

The method of any preceding clause, wherein the electrically isolating material includes fiberglass plies.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An airfoil structure, comprising:
   an airfoil platform;
   a composite material;
   a load spreader block; and
   a shim material,
   the composite material and the load spreader block positioned on the airfoil platform, the composite material having a first stiffness and the load spreader block having a second stiffness; and
   the shim material positioned between the composite material and the load spreader block, the shim material having a third stiffness different from at least one of the first stiffness or the second stiffness, wherein the shim material includes an interrupted surface area between a first bolted joint and a second bolted joint.

2. The airfoil structure of claim 1, wherein the airfoil structure forms a part of a cantilevered-supported airfoil.

3. The airfoil structure of claim 1, wherein the shim material is a nickel-chromium-based superalloy.

4. The airfoil structure of claim 1, wherein the load spreader block includes at least one bolted connection.

5. The airfoil structure of claim 1, wherein a Young's modulus associated with the third stiffness is higher than the Young's modulus associated with at least one of the first stiffness or the second stiffness.

6. The airfoil structure of claim 1, wherein the shim material covers at least 10% of an interface surface between the load spreader block and the composite material.

7. The airfoil structure of claim 1, wherein the shim material includes a perforated surface.

8. The airfoil structure of claim 1, wherein a thickness of the shim material is increased to prevent contact between the composite material and the load spreader block.

9. The airfoil structure of claim 1, wherein a layer of fiberglass plies separates at least one of the load spreader block or the composite material from the shim material.

10. An airfoil structure, comprising:
  a first shim material positioned adjacent to a load spreader block; and
  a second shim material positioned adjacent to an airfoil, wherein the first shim material is in contact with the second shim material, a first stiffness of the first shim material and a second stiffness of the second shim material different from at least one of (1) a third stiffness of the load spreader block or (2) a fourth stiffness of the airfoil, wherein the first shim material or the second shim material includes an interrupted surface area between a first bolted joint and a second bolted joint.

11. The airfoil structure of claim 10, wherein the airfoil structure forms a part of a cantilevered-supported airfoil.

12. The airfoil structure of claim 10, wherein the first shim material or the second shim material is a nickel-chromium-based superalloy.

13. The airfoil structure of claim 10, wherein the load spreader block includes at least one bolted connection.

14. The airfoil structure of claim 10, wherein a Young's modulus associated with the first stiffness or the second stiffness is higher than the Young's modulus associated with at least one of the third stiffness or the fourth stiffness.

15. The airfoil structure of claim 10, wherein at least one of the first shim material or the second shim material covers at least 10% of an interface surface between the load spreader block and a composite material of the airfoil structure.

16. The airfoil structure of claim 10, wherein at least one of the first shim material or the second shim material includes a perforated surface.

17. The airfoil structure of claim 10, wherein a first layer of fiberglass plies separates the first shim material from the load spreader block.

18. The airfoil structure of claim 10, wherein a first layer of fiberglass plies is positioned at an upper surface of the first shim material and a second layer of fiberglass is positioned at a lower surface of the first shim material.

* * * * *